May 15, 1962     K. KLEHR     3,034,551
PRESSURIZED FRICTION JOINT FOR HAND LUGGAGE
Filed March 31, 1959
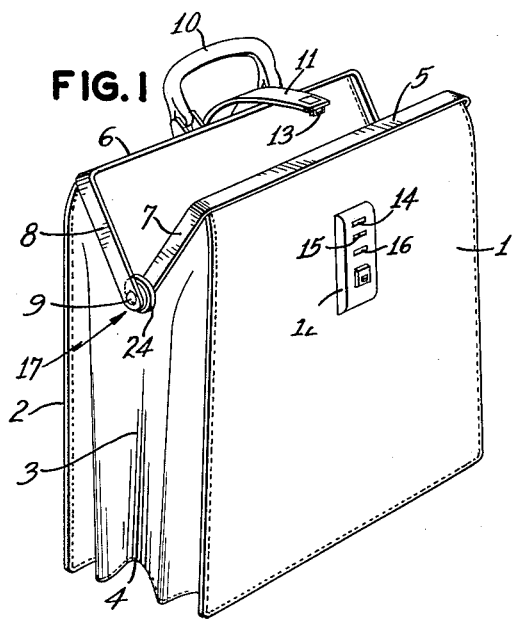
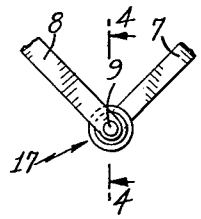
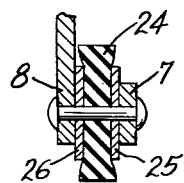
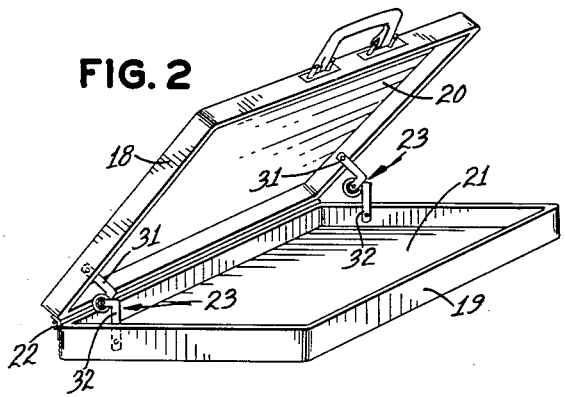
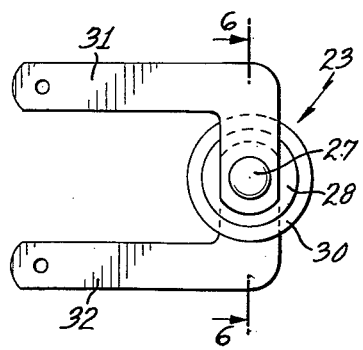
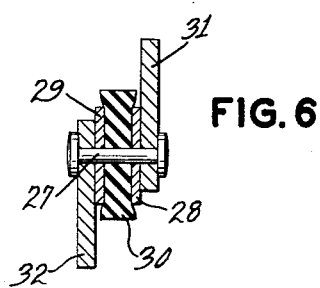
INVENTOR.
KENNETH KLEHR

United States Patent Office 3,034,551
Patented May 15, 1962

3,034,551
PRESSURIZED FRICTION JOINT FOR HAND LUGGAGE
Kenneth Klehr, 980 Greenwood Road, Union, N.J.
Filed Mar. 31, 1959, Ser. No. 803,118
3 Claims. (Cl. 150—1.6)

The present invention deals with a pressurized friction joint and more particularly with a pressurized friction joint or hinge for hand luggage including brief bags, brief cases and the like.

Hand luggage, such as brief bags and brief cases, usually comprise a pair of complementary pivotally joined frame members adapted to rotate at the frame pivots for opening and closing the brief bag or brief case. One type of hand luggage herein contemplated comprises a brief bag having a pair of complementary U-shaped frame members defining the mouth of the brief bag. The U-shaped frame members are pivotally joined at their ends and telescopically mounted in relation to each other, whereby the brief bag is adapted for opening and closing by the angular movement of the U-shaped frame members inwardly and outwardly of each other. Another type hand luggage herein contemplated is a brief case comprising a pair of rectangular frames provided with a hinge pivotally joining two sides thereof. In either of the above-mentioned types of hand luggage, it is advantageous to provide a means whereby the brief bags and brief cases can maintain an open position to facilitate the insertion or removal of contents. One type of such means for maintaining the brief bags or brief cases in open position is a latch mechanism provided with a catch for maintaining the bag or the like in only a fully opened position, there being no provision for maintaining the bag in an intermediate open position. Another type of such means is a friction hinge which permits selective open positions. In the latter type, the friction hinge is subject to wear, whereafter the hinge is no longer capable of maintaining selective open positions unless the hinge is repaired or otherwise mechanically adjusted to compensate for the wear and to reestablish operability.

The present invention contemplates a remedy for the above-mentioned disadvantages and provides a pressurized friction hinge, whereby the brief bag or brief case maintains a selective open position during the entire life of the brief bag or brief case.

It is an object of the invention to provide a pressurized friction joint for brief bags and brief cases, whereby the joint compensates for wear and maintains an optimum friction between joint components for the entire life of the brief bag or brief case. It is another object of the present invention to provide the friction joint as a hinge. It is a further object of the invention to provide the friction joint as a friction means cooperative with a hinge member. Other objects and advantages of the invention will become apparent from the description hereinafter following and the drawing forming a part hereof, in which:

FIGURE 1 is an isometric view of a brief bag including the pressurized joint of the invention, FIGURE 2 is an isometric view of a brief case including the pressurized joint of the invention, FIGURE 3 is a fragmentary enlarged view of the pressurized joint of the invention in the form of a hinge as applied to FIGURE 1, FIGURE 4 is a cross-sectional view along lines 4—4 of FIGURE 3, FIGURE 5 is a side view of a modified form of the pressurized joint of the invention as applied to FIGURE 2, and FIGURE 6 is a cross-sectional view along lines 6—6 of FIGURE 5.

Regarding FIGURE 1, one form of brief bag to which the invention is applicable comprises sides 1 and 2 connected by a gusset 3, e.g. a gusset of the expandable type, including a bottom 4. The top portions of the sides 1 and 2 are preferably curved inwardly facing each other and are secured to two U-shaped members having bridge portions 5 and 6, respectively, and particularly to the said bridge portions. The upper portions of the gusset 3 separating the sides 1 and 2 are secured on both ends of the brief bag to the legs 7 and 8 of the U-shaped members. The opening or mouth of the brief bag is defined by a frame composed of the U-shaped members which are pivotally secured to each other by pivot pins 9 at the ends of the legs 7 and 8 and pivotally joining the legs. The U-shaped members are telescopically mounted in relation with each other in such manner that one of the U-shaped members fits into the other so that when the bag is closed one of the frame members is an upper member and the other a lower member in vertically juxtaposed relationship. Angular movement of the U-shaped members results in the opening and closing of the brief bag. A handle 10 is secured to the upper U-shaped frame member.

Brief bags of the type above described are provided with a locking means comprising a tongue 11 secured to a top central portion of one side, e.g. side 2, and of a length sufficient to straddle the mouth of the bag, when in closed position, and engage a lock member 12 positioned on the other side of the brief bag, e.g. side 1. The free end of the tongue 11 is provided with a hasp 13 engageable with one of a plurality of vertically spaced apertures 14, 15 and 16 of lock member 12 as illustrated.

The invention is particularly directed to the friction joint 17 forming a hinge for the legs 7 and 8. The other legs of the U-shaped member are similarly hinged.

FIGURE 2 illustrates another form of hand luggage in the form of a brief case which comprises a pair of rectangular frames 18 and 19 with panels 20 and 21 secured to the perimetrical edges on one side of each frame and covering the openings of frames 18 and 19, respectively, thereby forming a pair of mating box-like members. The frames are hinged together by means of hinge 22 along a pair of mating sides with the panel-free frame edges adapted to engage or contact each other and form a closure. In addition to the hinge 22, the frames 18 and 19 are further joined by means of a friction joint 23, which is a modification of joint 17 and to which the invention is directed. Preferably, a pair of such joints 23 are employed with a pair of opposite sides of the frame being provided with such joint substantially near the hinge 22.

FIGURES 3 and 4 illustrate enlarged views of the hinge 17 as applied to FIGURE 1. The hinge comprises a pair of legs 7 and 8 pivotally joined by the pivot pin 9. The hinge 17 includes essentially an apertured elastic rubber disc 24, e.g. a disc composed of gum rubber, having a pair of substantially rigid apertured thinner discs 25 and 26, e.g. metal discs, on opposite sides of the rubber disc 24. While the disc 24 is described as a rubber disc, the disc may be composed of other elastic plastic material. The combination of the pair of discs 25 and 26 with the elastic disc 24 therebetween is positioned between the legs 7 and 8 with the pivot 9 passing through and joining the hinge members, including the legs and discs, whereby the legs 7 and 8 are frictionally rotatable against the surfaces of the discs 25 and 26. In order to provide a desirable degree of friction, the pair of discs are compressed against the surfaces of the disc 24 sufficiently to reduce the normal thickness of the elastic disc, whereby the natural tendency of the elastic disc to resume its normal state pressurizes the pair of discs against the legs 7 and 8. The joint, therefore, is a pressurized joint, and such pressure is maintained substantially constant regardless of the friction wear of the discs 25 and 26.

FIGURES 5 and 6 illustrate enlarged views of a modified pressurized joint 23 as applied to FIGURE 2. The joint 23 comprises a pivot pin 27, substantially rigid discs 28 and 29, and elastic disc 30, which pivot pin and discs are identical in structure as the corresponding members described with respect to FIGURES 3 and 4. However, the legs 31 and 32 are modified into an L-shaped form with the pivot pin 27 passing through the shorter arms of the L-shaped legs. The longer arms of the L-shaped legs are secured to the frames 18 and 19 thereby connecting the frames at a location near the hinge 22 of FIGURE 2.

With the pressurized joint of the present invention, it now becomes possible to hold the brief bag or brief case open at any desirable position under pressurized friction which is maintained substantially throughout the life of the brief bag or brief case.

While the invention is described specifically with regard to the illustrations, various modifications are contemplated within the scope of the appended claims:

What is claimed is:

1. A brief case comprising a pair of rectangular frames with panels secured to the perimetrical edges on one side of each frame, the frames being positioned between the panels, hinge means connecting one side of one frame to a side of the other frame, a pressurized friction joint comprising a pair of arms pivotally joined at one end thereof by a pivot member passing through said ends, the other ends of said arms connecting said frames between two sides thereof, an apertured elastic disc member, a pair of substantially rigid apertured thin plate members, the elastic member positioned between the plate members, the combined plates and elastic member positioned between said arms with said pivot member passing through the apertures thereof, the plate members being compressed against said elastic member sufficiently to deform the normal state of the elastic member, whereby the normal tendency of the elastic member to regain its normal state pressurizes the plates against said arms.

2. An article of luggage according to claim 1, wherein the plate members are in the form of discs.

3. An article of luggage according to claim 1, wherein the elastic member is composed of gum rubber.

References Cited in the file of this patent

UNITED STATES PATENTS

| | | |
|---|---|---|
| 128,503 | Patterson | July 2, 1872 |
| 533,743 | Prahar | Feb. 5, 1895 |
| 1,101,817 | Shirreffs | June 30, 1914 |
| 1,806,246 | Feldman et al. | May 19, 1931 |
| 1,867,346 | Bittorf | July 12, 1932 |
| 2,539,066 | Falk | Jan. 23, 1951 |
| 2,725,232 | Magida | Nov. 29, 1955 |
| 2,804,901 | Lifton | Sept. 3, 1957 |
| 2,945,582 | Abraham et al. | July 19, 1960 |